Patented Sept. 8, 1936

2,053,276

UNITED STATES PATENT OFFICE 2,053,276

COLORATION OF TEXTILE MATERIAL

George Holland Ellis, Spondon, near Derby, England, assignor to Celanese Corporation of America, a corporation of Delaware No Drawing. Application October 23, 1934, Serial No. 749,619. In Great Britain November 17, 1933

9 Claims. (Cl. 8—5)

This invention relates to the coloration of cellulose ester or ether materials.

The artificial silk spun from solutions of cellulose acetate is a very important textile material commercially. Its dyeing properties are, however, very different from those of the older textile materials such as cotton, silk and wool, and the methods and coloring matters employed in connection with these latter materials are not in general applicable in the case of cellulose acetate. The coloration of cellulose acetate is usually effected by means of water-insoluble coloring matters, applied to the material in the form of aqueous suspensions or dispersions. In this way it has been found possible to obtain satisfactory colorations of great uniformity, a result difficult to obtain by means of those water-soluble coloring matters which have affinity for cellulose acetate. Amongst the water-insoluble coloring matters having affinity for cellulose acetate are a number of compounds, in particular the arylamino-anthraquinones, which, while capable of yielding colorations of extremely good fastness properties, do not possess a very high affinity for the material. In many cases the affinity of the arylamino-anthraquinones is insufficient to enable deep shades to be obtained by their use. As the arylamino-anthraquinones include compounds yielding very desirable shades, and in particular blue shades, upon cellulose acetate and other cellulose esters or ethers, it will be appreciated that a method of increasing the affinity thereof for the said materials is of great value.

I have now found that water-insoluble coloring matters, and in particular the arylamino-anthraquinone coloring matters, may with great advantage be applied to cellulose acetate and other cellulose ester or ether materials in conjunction with water-soluble organic compounds which have a solvent or softening action on the coloring matter and/or on the cellulose acetate or other cellulose ester or ether. The water-soluble organic compounds may, for instance, be added to the suspension or dispersion of the coloring matter with which the cellulose acetate or other material is to be colored. Preferably, the dyestuff is dissolved partially or completely in the water-soluble organic solvent, and the mixture diluted, in the presence of a dispersing agent, with sufficient water to form a dyebath in which the material is dyed. In this way it has been found possible to increase materially the depth of shade obtainable with certain arylamino-anthraquinones which yield on cellulose acetate shades of extreme fastness properties but which do not exhibit a very high affinity for cellulose acetate when applied thereto in the form of a simple aqueous suspension or dispersion.

Particular mention may be made in this connection of the α-α-dihydroxy-anthraquinones substituted in one of the remaining alpha positions by an amino or non-aromatically substituted amino group, and in the other by means of an arylamino group, which coloring matters are described in U. S. application S. No. 655,615 filed 7th February, 1933, and of the arylamino-anthraquinones substituted in the arylamino groups by ether groups, which coloring matters are described in U. S. application S. No. 655,616 filed 7th February, 1933.

Various water-soluble organic compounds having a solvent or softening action on water-insoluble dyestuffs and/or cellulose acetate or other cellulose esters or ethers, may be employed for the purposes of the invention. Particular mention may be made of those compounds which are readily volatile and/or freely soluble in water. There may be employed, for instance, various alcohols, for example, methyl or ethyl alcohol, and various ketones, for example acetone or ethyl-methyl ketone. Again, water-soluble esters or acetic acid may be utilized in accordance with the invention.

It has been found, however, particularly advantageous to make use of water-soluble heterocyclic organic bases, for example pyridine, quinoline, isoquinoline or their homologues and substitution products or hydrogenized derivatives of these heterocyclic bases, for example piperidine. Other water-soluble organic bases may, however, be employed, for example aliphatic bases, e. g. butylamine or amylamine.

Particularly satisfactory results may be obtained by the employment of pyridine or its homologues, for example commercial pyridine or commercial mixtures comprising pyridine and/or its homologues. Pyridine, for example, may be employed in the proportion of from 1 to 10 grams per litre or more of a dye-bath. The concentration of pyridine in a dye-bath should preferably not exceed about 15 to 20 grams per litre, as otherwise there may be danger of impairing the lustre, tenacity or other property of the cellulose acetate or cellulose ester or ether material to be dyed, especially at temperatures of 70–85° C. such as are often employed in the dyeing of cellulose ester or ether materials. In the case of printing pastes or padding baths, however, high concentrations are often useful, for example 20–100 grams per litre.

Various arylamino-anthraquinone coloring matters may, in accordance with the invention, be applied in conjunction with water-soluble organic compounds which have a solvent or softening action on the dyestuff and/or on the cellulose acetate or other cellulose ester or ether material. Mention may be made, for instance, of the simple phenylamino and other simple arylamino-anthraquinones, e. g. 1-phenyl-amino-anthraquinone, or 1-m-tolylamino-anthraquinone. The invention is, however, of special advantage in connection with the application of α-arylamino-anthraquinones having hydroxyl groups, amino groups, or aliphatically-substituted amino groups in para positions to the arylamino groups. These dyestuffs are of special interest in that by their aid it is possible to produce desirable shades of blue on cellulose ester or ether materials. As examples of dyestuffs which may be applied according to the present invention, mention may be made of the following:—

(a) 1-hydroxy - 4 - arylamino-anthraquinones, e. g. 1-hydroxy-4-phenylamino-anthraquinone.

(b) 1-amino- or 1-alkylamino-4-arylamino-anthraquinones, e. g. 1-amino- or 1-methylamino-4-phenylamino-anthraquinone.

(c) The anthraquinone compounds referred to in U. S. application S. No. 655,614 filed 7th February, 1933, and consisting of anthraquinone having in one alpha position a hydroxyl group, in a second alpha position an arylamino group and in a third alpha position an amino group or a non-aromatically substituted amino group.

(d) The coloring matters referred to in U. S. application S. No. 655,615 and consisting of anthraquinone having in one alpha position a hydroxyl group, in a second alpha position an arylamino group and in a third alpha position an amino group or a non-aromatically substituted amino group, together with a further substituent or substituents, and in particular an α-hydroxyl group, especially the compound 1-amino-5-phenylamino-4:8-dihydroxy anthraquinone.

(e) The m-alkyl-phenylamino-anthraquinones and m-alkyloxy-phenylamino-anthraquinones referred to in U. S. application S. No. 655,613 filed 7th February, 1933, for example 1-m-tolylamino-anthraquinone or 1-amino-4-m-tolylamino-anthraquinone.

(f) The arylamino-anthraquinones substituted in the arylamino groups by ether groups, referred to in U. S. application S. No. 655,616, for example 1-amino-4-(o-methoxy-phenyl - amino)-anthraquinone or 1-methyl-amino-4-ortho-anisidino-anthraquinone.

Other coloring matters having a relatively low affinity for cellulose esters or ethers may, however, be applied with advantage in accordance with the process of the present invention. For example, the benzoyl amino- and other acidyl-amino-anthraquinones and other anthraquinone dyestuffs of the kind which are usually applied in the form of leuco compounds when dyeing cotton, silk or wool. The process may, moreover, be utilized when applying other water-insoluble dyestuffs, e. g. azo dyestuffs, to cellulose esters and ethers, whether or not such dyestuffs have small affinity for the material.

The water-soluble organic bodies are, in general, advantageously used in conjunction with dispersing agents for the dyestuffs, for instance, sulphuric acid esters of higher aliphatic alcohols, formaldehyde-naphthalene-sulphuric acid compounds, alkyl-, cyclo-alkyl and aralkyl-sulphonic acids, sulphonic acid compounds of mineral oils, tar oils, brown coal tar oils and the like, and their products of condensation with alcohols, and the various dispersing agents referred to in U. S. Patent Nos. 1,618,413, 1,618,414, 1,694,413, 1,690,481, 1,803,008, 1,840,572, 1,716,721, 1,928,647 and 1,959,352. If desired, protective colloids may be employed with the water-soluble organic bodies either with or without dispersing agents. As examples may be mentioned glue, gelatine and sulphite cellulose waste liquor or its constituents or products of transformation, e. g. lignin sulphonic acid compounds.

The water-soluble organic compounds may be utilized in various ways. Thus, for example, they may be simply added to a dye-bath, together with the dyestuff, with or without dispersing agents and/or protective colloids. It has, however, been found particularly advantageous, as indicated previously, to dissolve the dystuff partially or completely in the water-soluble organic compound, and to dilute the resulting mixture with water in the presence of a dispersing agent to form a dye-bath of the concentration requisite for the dyeing operation. Preparations, especially concentrated preparations, comprising the dyestuff and pyridine, or other water-soluble organic solvent or softening agent for the dyestuff and/or the cellulose derivative, with or without a dispersing agent and/or a protective colloid, are included within the scope of the invention.

The invention is applicable, not only to the dyeing of cellulose ester or ether materials from dye-baths, but also to their coloration by other methods, for example padding or printing or other method of local coloration. The pyridine or other water-soluble organic compound may, for example, be incorporated in padding liquors or printing pastes.

The following example illustrates the invention without being in any way limitative:—

Example

To dye 10 kilograms of cellulose acetate knitted fabric in a blue shade:—

100 grams of finely powdered 1-amino-5-phenylamino 4:8-dioxy-anthraquinone is boiled in 10 times its weight of pyridine. To this mixture while heating is added 1 litre of Turkey red oil and the resulting preparation diluted with 10 litres of boiling 2.5 grams per litre soap solution. The resulting dispersion is then further diluted to 300 litres with 2.5 grams per litre soap solution. The previously scoured cellulose acetate fabric is entered in rope form into the dyebath and dyeing effected for 1½ hours commencing at 20° C. and finishing at 75° C. The goods are then washed off thoroughly and dried or otherwise treated as desired or requisite.

The invention is of special importance in connection with the coloration of cellulose acetate materials. It may, however, be applied in the coloration of other cellulose ester or ether materials, for example materials of cellulose formate, propionate, or butyrate, or methyl, ethyl, or benzyl cellulose. It is not restricted to the coloration of materials which have been produced by extrusion of solutions of cellulose esters or ethers, as it may be applied in connection with cellulose ester or ether materials which have been produced by esterifying or etherifying cellulose or regenerated cellulose, while retaining its fibrous form. As examples of such materials may be mentioned the product known as immunized cotton, and obtained by the action of p-toluene-sulphonic-chloride on alkali cellulose.

What I claim and desire to secure by Letters Patent is:—

1. The process of preparing a dyebath from a water-insoluble arylamino anthraquinone dyestuff, which comprises diluting with water, in the presence of a dispersing agent, a mixture of the dyestuff and a water-soluble organic base.

2. The process of preparing a dye-bath from a water-insoluble arylamino anthraquinone dyestuff which comprises diluting with water, in the presence of a dispersing agent, a mixture of the dyestuff and a water-soluble heterocyclic organic base.

3. The process of preparing a dye-bath from a water-insoluble arylamino anthraquinone dyestuff which comprises diluting with water, in the presence of a dispersing agent, a mixture of the dyestuff and pyridine.

4. The process of preparing a dyebath from a water-insoluble arylamino anthraquinone dyestuff, which comprises heating the dyestuff with a water-soluble organic base, mixing while hot with a dispersing agent and diluting the mixture with water.

5. The process of preparing a dyebath from a water-insoluble arylamino anthraquinone dyestuff, which comprises heating the dyestuff with pyridine, mixing while hot with Turkey red oil, and diluting the mixture with water.

6. The process of preparing a dyebath from 1-amino-5-phenylamino-4:8-dioxy-anthraquinone, which comprises heating the dyestuff with pyridine, mixing while hot with Turkey red oil, and diluting the mixture with an aqueous soap solution.

7. The process of dyeing an organic derivative of cellulose with a water-insoluble arylamino anthraquinone dyestuff, which comprises mixing the dyestuff with a water-soluble organic base, diluting the mixture with water in the presence of a dispersing agent, and immersing the organic derivative of cellulose in the dispersion so obtained.

8. The process of dyeing cellulose acetate with a water-insoluble arylamino anthraquinone dyestuff, which comprises heating the dyestuff with a water-soluble heterocyclic organic base, diluting the hot mixture with water in the presence of a dispersing agent, and immersing the cellulose acetate in the dispersion so obtained.

9. The process of dyeing cellulose acetate with a water insoluble arylamino anthraquinone dyestuff, which comprises heating the dyestuff with pyridine, mixing while hot with Turkey red oil, diluting the mixture with an aqueous soap solution, and immersing the cellulose acetate in the dispersion so obtained.

GEORGE HOLLAND ELLIS.